Sept. 2, 1958 G. W. ARCHER 2,850,315
LOG CHOKER GUIDE
Filed Jan. 7, 1955

INVENTOR.
GEORGE W. ARCHER
BY

United States Patent Office 2,850,315
Patented Sept. 2, 1958

2,850,315
LOG CHOKER GUIDE
George W. Archer, Manton, Calif.
Application January 7, 1955, Serial No. 480,437
4 Claims. (Cl. 294—55)

This invention relates to a new and useful device for guiding a cable or choker under a felled tree or log.

In the logging industry it is conventional practice to drag felled trees from the location where they are cut to a mill or to a point of transportation by means of a cable choker cinched around the tree and pulled by a tractor or other prime mover. Frequently the sheer weight and impact of a tree in being felled will result in the tree partially imbedding itself in the earth which creates a problem in passing the cable end under the tree to form the choker. In more conventional practice, loggers excavate or dig a small channel under the felled tree using a hand shovel or similar trenching tool. This procedure can become exceedingly difficult and time consuming in excavating under a tree where submerged rocks, roots or branches are encountered. In the usual practice, after the channel is dug under the tree, one end of the choker cable is worked or threaded through the channel under the tree and then formed into a noose around the tree.

A principal object of the present invention is to provide a cable guide device which may be worked or passed with relative ease under a felled tree to facilitate the passing of a cable or choker end around the trunk of the tree preparatory to dragging the tree away from its cutting site.

Another object of the invention is to provide a cable guide device of the character briefly mentioned above which may be utilized either to guide the cable end under a tree simultaneously with the working or passing of the device under said tree, or, alternatively, to guide the cable end under the tree in a direction opposite from which the guide device itself is initially worked under the tree.

Other numerous objects and advantages of the invention will become apparent upon reading the following specification and referring to the accompanying drawings in which similar characters of reference represent corresponding parts in each of the several views.

Figure 1:
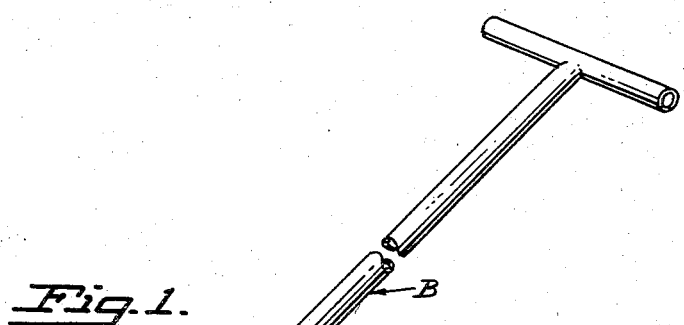
Fig. 1 is a perspective view of the invention showing a portion of the handle broken away.
Figure 2:
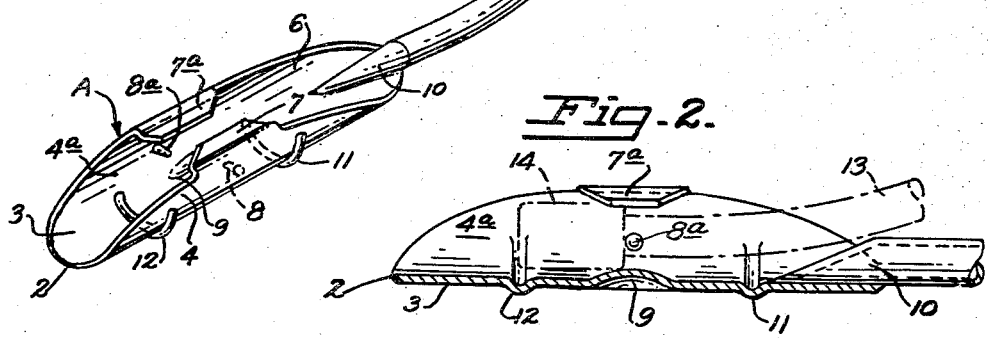
Fig. 2 is an enlarged, fragmentary, longitudinal, sectional view of the working head of the device and showing in outline a cable and attached choker button.
Figure 4:
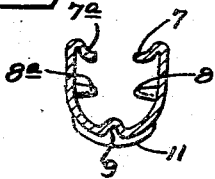
Fig. 4 is a sectional view taken substantially on line 4—4 of Fig. 3.

Essentially the invention comprises a working head in the form of a spade unit indicated generally at A, secured to a suitable handle, indicated generally at B.

Referring more particularly to Figs. 1–4 of the drawings, the spade unit heretofore indicated generally at A is rounded U-shaped in cross-section and comprises a bottom web portion 3 and two semi-elliptical sides 4 and 4ª defining a cable receiving channel recess 6. The forward end of the spade portion A terminates in an arcuate, relatively sharp, cutting edge 2. The upper center portion of each semi-elliptical side 4 and 4ª is formed with an inwardly turned flange indicated at 7 and 7ª, respectively. Moreover, each side is further provided with, or has impressed therein, a centrally located lug indicated at 8 and 8ª, each of which is disposed below an adjacent flange 7 and 7ª and in the same transverse plane as the said flanges.

The spade unit A is further formed with or has impressed therein first, second and third inwardly disposed crimps, indicated at 9, 11 and 12, respectively. Crimp 9 is formed in web 3 immediately below and in alignment with the flanges 7—7ª and lugs 8—8ª. As will more fully hereinafter appear, the purpose of the crimp 9 is to provide an inwardly projecting localized bearing pad which functions to maintain the cable button which the channeled spade head A is adapted to accommodate in spaced relation from the bottom and side walls of the spade unit A, and to provide a fulcrum point about which the cable button can be rocked to dislodge it from wedged position within the channel recess 6 due to packing of earth or rocks in the recess.

Crimps 11 and 12 define spaced semi-annular rings extending around the body of the spade unit A to augment transverse rigidity of the sides 4 and 4ª and web 3.

Handle B, secured to the rear of spade unit A by a conventional ferrule indicated at 10, projects outwardly and upwardly from said spade unit in a plane substantially parallel to the longitudinal axis of channel recess 6.

Cables used in a logging industry to form chokers around felled trees vary in size, as do also the enlarged buttons conventionally secured to one end of the cables. The instant device is designed to receive a cable 13 (see Figs. 2–3) to one end of which is attached a conventional button 14 which, in turn, is adapted to be positioned within the channel recess 6 of the spade portion A as will more fully be described hereinafter. It is readily appreciated that the size of the spade head channel and other parts may be manufactured in varying sizes depending on the relative size of the cable and its associated button in connection with which a particular device is to be used.

Figure 6:
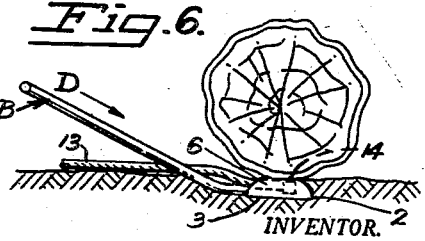

In operation, a cable guide device embodying the present invention may be employed in several alternative ways. In one application of use, the button end 16 of the cable is placed in the forward portion of the channel recess of the spade unit A with the inner end of the button abutting lugs 8 and 8ª and with the cable extending rearwardly and outwardly from the channel in a direction generally paralleling the axis of the handle B. With the button end of the cable thus positioned, the spade end A is worked under the felled tree from one side of the tree to the other, in the direction of arrow D, carrying with it the cable (see, for example, Fig. 6). The relatively sharp front cutting edge 2 in conjunction with the relatively streamlined shape of the spade head A as defined by semi-elliptical edges of sides 4 and 4ª contribute toward providing maximum ease and minimum obstruction in working the spade and accompanying cable under the tree. Lugs 8—8ª against which the inner end of the button is abutted prevent the latter from rearward displacement as the spade head A is worked beneath the felled trunk, whereas flanges 7—7ª prevent the button 14 from becoming dislodged by upward movement.

As heretofore indicated, crimp 9 provides a localized bearing pad or fulcrum point on which the button rests and by virtue of which the major portion of the button is maintained in spaced relation from the button web 6 and sides 4—4ª of the spade unit. In working the spade head with the cable button positioned in the channel recess in the manner above explained, it is usual for dirt and small rocks to become tightly packed and jammed between the button and the surrounding web and side portions of the spade unit. By providing the localized bearing pad established by crimp 9, the button may be virtually rocked back and forth on the pad to loosen the packed dirt and rocks and permit easy withdrawal of the button from the channel recess 6 of the spade unit after the latter has been worked from one side of the log to the other. After removal of the button end of the cable from the spade unit A, an operator may withdraw the tool from under the tree and the button end of the cable can then be passed around the trunk of the tree to form the choker noose.

Figure 3:
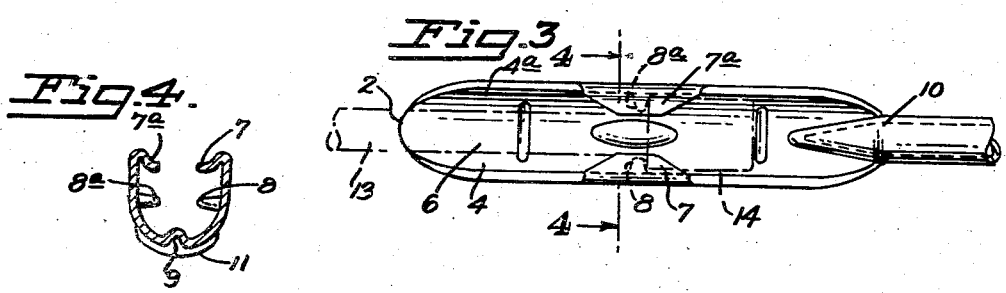
Fig. 3 is an enlarged, fragmentary, plan view of the working head of the guide device and showing in outline a cable and button in an alternative position of use.
Figure 5:
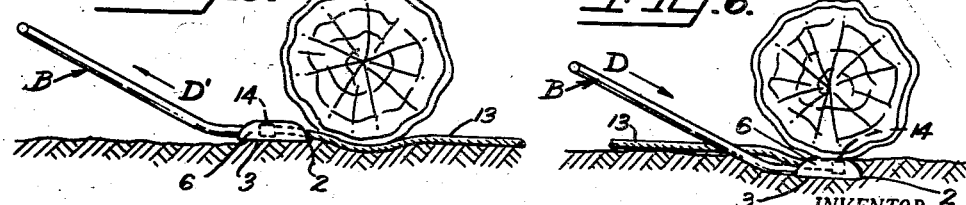
Figs. 5 and 6 illustrate schematically alternative methods of utilizing the device for guiding a cable under a felled tree.

An alternative method of passing the cable under the felled tree is illustrated in Figs. 3 and 5. In this method, the spade unit A is first worked or passed under the felled tree from one side to the other. With the handle on one side and the spade head A on the other side of the tree, the cable button is secured within the spade recess in the manner indicated particularly in Fig. 3. More specifically, cable button 14 is positioned in the rearward half or portion of the channel recess 6 and with the inner end of the button abutting against the rearwardly disposed surfaces of lugs 8—8ª. The cable itself is led outwardly through the forward half of the channel recess and as the tool is withdrawn from one side of the log to the other (in the direction of arrow D' as shown in Fig. 5), the cable is, of course, pulled under the log. After the spade end of the tool has been withdrawn from under the felled tree, the button end of the cable may be removed from it in substantially the same manner as hereinabove described. In particular, if dirt and small rocks have packed between the button and adjacent wall surfaces of the spade unit, the button may be easily released from wedged engagement simply by rocking it back and forth on crimp or bearing pad 9 functioning as before as the fulcrum rocker point.

Although the present invention has been described in some detail by way of illustration and example for purposes of clarity of understanding, it is understood that certain changes and modifications might be practiced within the spirit of the invention as limited only by the scope of the claims appended hereto.

I claim:

1. A tool for receiving and guiding the button-end of a log choker cable beneath the trunk of a felled tree or the like comprising: a spade unit including a bottom web portion and two substantially parallel sides defining in cross-section a rounded U-shaped cable receiving channel recess; the sides of said spade unit being substantially semi-elliptical in side elevation; lug means extending inwardly into said channel recess from at least one side of said spade unit against which the inner end of a cable button positioned in said channel recess can abut; abutment means associated with at least one of said sides for preventing upward displacement of said button from said channel recess; and a handle secured to said spade unit extending rearwardly therefrom in a plane substantially parallel to the longitudinal axis of the channel recess.

2. The combination of claim 1 and wherein said named means for preventing upward displacement of said button from said channel recess comprises first and second flanges extending inwardly from the upper center portions of the semi-elliptical sides to overlie a portion of said channel recess and said button positioned in said channel recess.

3. The combination of claim 1 and wherein there is provided a bearing pad of restricted area projecting inwardly and upwardly from the central portion of said bottom web on which the inner end portion of the cable button is supported and maintained in spaced relation from surrounding side and web areas of the channel recess.

4. A tool for guiding the button-end of a log choker cable beneath the trunk of a felled tree or the like comprising: a spade unit including a bottom web portion and two substantially parallel sides defining in cross-section a U-shaped cable receiving channel recess; the sides of said spade unit being substantially semi-elliptical in side elevation; first and second flanges projecting inwardly from the upper centrally located margins of said sides overlying a portion of said channel recess for preventing upward displacement of a cable button positioned within said channel recess; first and second abutment lugs disposed between said web and said first and second flanges projecting inwardly from opposite sides of said spade unit into said channel recess and against which the inner end of said cable button positioned in said channel recess can be abutted; said first and second lugs being disposed generally in the same transverse plane as said first and second flanges; a bearing pad of restricted area projecting inwardly and upwardly from the central portion of said bottom web and disposed generally in the same transverse plane as the said first and second flanges and said first and second lugs; said bearing pad establishing a fulcrum point on which a said cable button positioned in said channel recess may be rocked within said channel recess; and a handle secured to said spade unit extending rearwardly therefrom in a plane substantially parallel to the longitudinal axis of said channel recess.

References Cited in the file of this patent

UNITED STATES PATENTS

| | | |
|---|---|---|
| 849,957 | Zwiebel | Apr. 9, 1907 |
| 1,260,583 | Schwartz | Mar. 26, 1918 |
| 1,314,072 | Ensteness | Aug. 26, 1919 |
| 1,458,039 | Eiermann | June 5, 1923 |
| 1,829,002 | Gillogly | Oct. 27, 1931 |
| 1,888,269 | Herst | Nov. 22, 1932 |
| 2,240,510 | Meighan | May 6, 1941 |